United States Patent
Dombrowa et al.

(10) Patent No.: US 7,529,979 B2
(45) Date of Patent: May 5, 2009

(54) HARDWARE/SOFTWARE BASED INDIRECT TIME STAMPING METHODOLOGY FOR PROACTIVE HARDWARE/SOFTWARE EVENT DETECTION AND CONTROL

(75) Inventors: Marc B. Dombrowa, Bronx, NY (US); Dirk I. Hoenicke, Ossining, NY (US); Ramendra K. Sahoo, Mohegan Lake, NY (US); Krishnan Sugavanam, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 10/735,412

(22) Filed: Dec. 12, 2003

(65) Prior Publication Data

US 2005/0144532 A1  Jun. 30, 2005

(51) Int. Cl.
*G06F 11/00* (2006.01)
(52) U.S. Cl. ............... 714/39; 714/37; 714/45; 709/224
(58) Field of Classification Search .......... 714/39, 714/26, 37, 45
See application file for complete search history.

(56) References Cited

U.S. PATENT DOCUMENTS

| | | | | |
|---|---|---|---|---|
| 5,251,144 A * | 10/1993 | Ramamurthi | ............ | 700/177 |
| 5,386,542 A | 1/1995 | Brann | ............ | 395/550 |
| 5,566,092 A * | 10/1996 | Wang et al. | ............ | 702/185 |
| 5,778,150 A * | 7/1998 | Chan et al. | ............ | 706/46 |
| 5,822,381 A * | 10/1998 | Parry et al. | ............ | 375/356 |
| 6,125,390 A * | 9/2000 | Touboul | ............ | 709/223 |
| 6,151,424 A * | 11/2000 | Hsu | ............ | 382/294 |
| 6,294,765 B1 * | 9/2001 | Brenn | ............ | 219/494 |
| 6,405,329 B1 * | 6/2002 | Colligan et al. | ............ | 714/57 |
| 6,430,712 B2 * | 8/2002 | Lewis | ............ | 714/47 |
| 6,529,954 B1 * | 3/2003 | Cookmeyer et al. | ............ | 709/224 |
| 6,535,122 B1 * | 3/2003 | Bristol | ............ | 340/506 |
| 6,539,337 B1 * | 3/2003 | Provan et al. | ............ | 702/183 |
| 6,546,507 B1 * | 4/2003 | Coyle et al. | ............ | 714/43 |
| 6,591,354 B1 * | 7/2003 | Mick et al. | ............ | 711/169 |
| 6,600,614 B2 * | 7/2003 | Lenny et al. | ............ | 360/31 |
| 6,633,835 B1 * | 10/2003 | Moran et al. | ............ | 702/190 |
| 6,651,182 B1 * | 11/2003 | Chang et al. | ............ | 714/3 |
| 6,751,573 B1 * | 6/2004 | Burch | ............ | 702/178 |
| 6,789,182 B1 * | 9/2004 | Brothers et al. | ............ | 712/30 |
| 6,801,138 B2 * | 10/2004 | Koike | ............ | 340/902 |
| 6,801,940 B1 * | 10/2004 | Moran et al. | ............ | 709/224 |
| 6,868,367 B2 * | 3/2005 | Yemini et al. | ............ | 702/183 |

(Continued)

*Primary Examiner*—Scott T. Baderman
*Assistant Examiner*—Loan Truong
(74) *Attorney, Agent, or Firm*—Michael J. Buchenhorner; Douglas W. Cameron

(57) ABSTRACT

An improved method and apparatus for time stamping events occurring on a large scale distributed network uses a local counter associated with each processor of the distributed network. Each counter resets at the same time globally so that all events are recorded with respect to a particular time. The counter is stopped when a critical event is detected. The events are masked or filtered in an online or offline fashion to eliminate non-critical events from triggering a collection by the system monitor or service/host processor. The masking can be done dynamically through the use of an event history logger. The central system may poll the remote processor periodically to receive the accurate counter value from the local counter and device control register. Remedial action can be taken when conditional probability calculations performed on the historical information indicate that a critical event is about to occur.

5 Claims, 9 Drawing Sheets

Toplevel Flow Chart

U.S. PATENT DOCUMENTS

| | | | |
|---|---|---|---|
| 6,925,367 B2* | 8/2005 | Fontius | 701/33 |
| 6,925,586 B1* | 8/2005 | Perrella et al. | 714/57 |
| 6,934,256 B1* | 8/2005 | Jacobson et al. | 370/235 |
| 6,978,302 B1* | 12/2005 | Chisholm et al. | 709/224 |
| 6,978,396 B2* | 12/2005 | Ruuth et al. | 714/6 |
| 6,988,090 B2* | 1/2006 | Yaginuma | 706/21 |
| 7,058,838 B2* | 6/2006 | Xu | 713/400 |
| 7,117,119 B2* | 10/2006 | Van Dyk et al. | 702/181 |
| 7,194,445 B2* | 3/2007 | Chan et al. | 706/20 |
| 7,254,514 B2* | 8/2007 | House et al. | 702/181 |
| 7,457,991 B1* | 11/2008 | Teague et al. | 714/47 |
| 2001/0032069 A1* | 10/2001 | Arweiler | 703/27 |
| 2002/0019870 A1* | 2/2002 | Chirashnya et al. | 709/224 |
| 2002/0042847 A1* | 4/2002 | Takats et al. | 709/316 |
| 2002/0065948 A1* | 5/2002 | Morris et al. | 709/318 |
| 2002/0174083 A1* | 11/2002 | Hellerstein et al. | 706/48 |
| 2002/0178403 A1* | 11/2002 | Floyd et al. | 714/39 |
| 2003/0005149 A1* | 1/2003 | Haas et al. | 709/238 |
| 2003/0014699 A1* | 1/2003 | Kallela et al. | 714/47 |
| 2003/0061514 A1* | 3/2003 | Bardsley et al. | 713/201 |
| 2003/0074439 A1* | 4/2003 | Grabarnik et al. | 709/224 |
| 2003/0145255 A1* | 7/2003 | Harty et al. | 714/48 |
| 2003/0204370 A1* | 10/2003 | Yemini et al. | 702/183 |
| 2003/0208523 A1* | 11/2003 | Gopalan et al. | 709/201 |
| 2004/0006724 A1* | 1/2004 | Lakshmanamurthy et al. | 714/25 |
| 2004/0044499 A1* | 3/2004 | House et al. | 702/181 |
| 2004/0064735 A1* | 4/2004 | Frazier et al. | 713/201 |
| 2004/0136379 A1* | 7/2004 | Liao et al. | 370/395.21 |
| 2004/0243548 A1* | 12/2004 | Hulten et al. | 707/3 |
| 2005/0055208 A1* | 3/2005 | Kibkalo et al. | 704/255 |
| 2005/0060619 A1* | 3/2005 | Liberty et al. | 714/55 |
| 2005/0091554 A1* | 4/2005 | Loukianov | 713/500 |
| 2006/0235629 A1* | 10/2006 | Walker et al. | 702/45 |

* cited by examiner

Fig 1. Event Logging Mechanism (100)

Figure 3 Off-line Mechanism

On-line Mechanism (1)

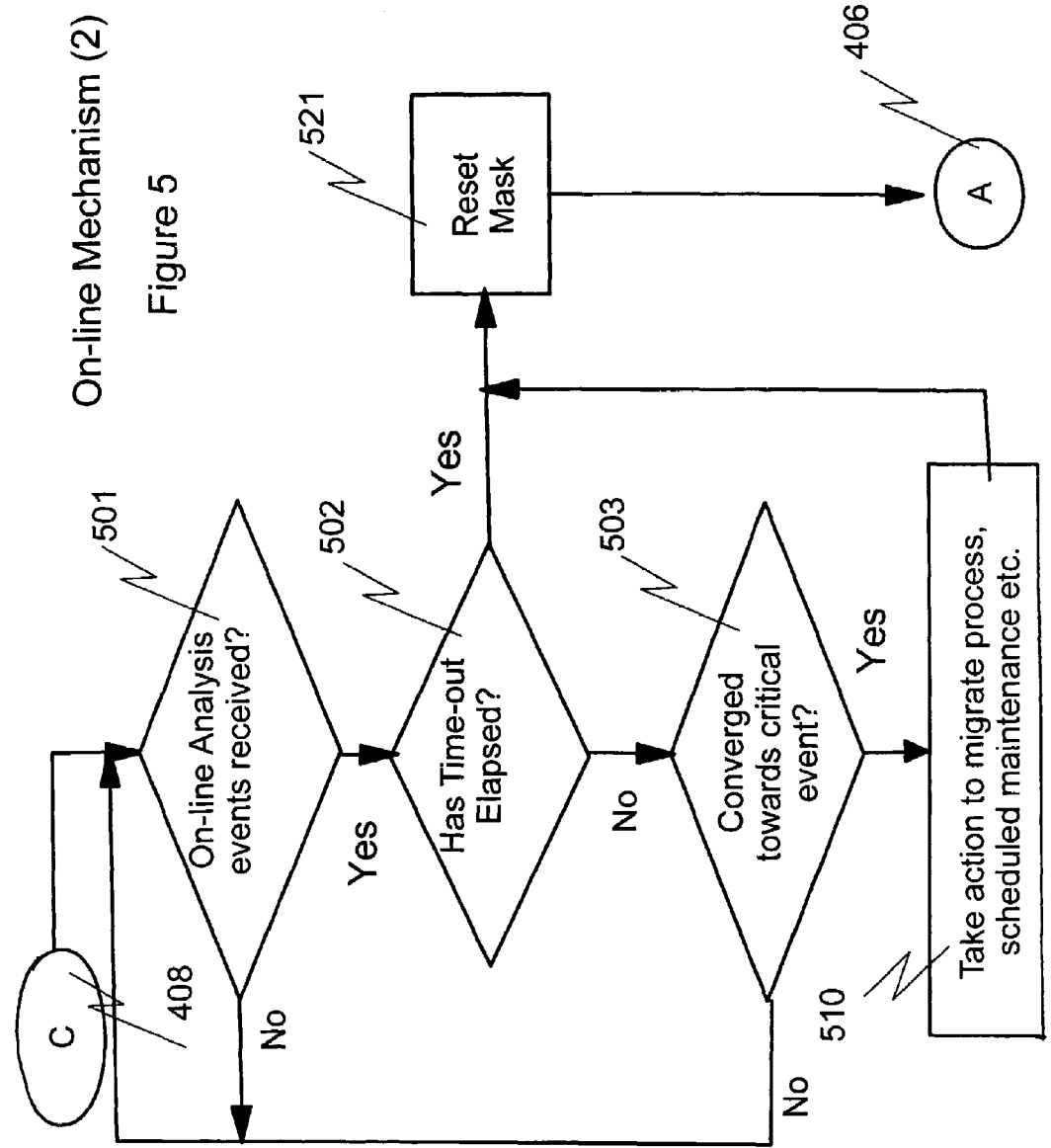

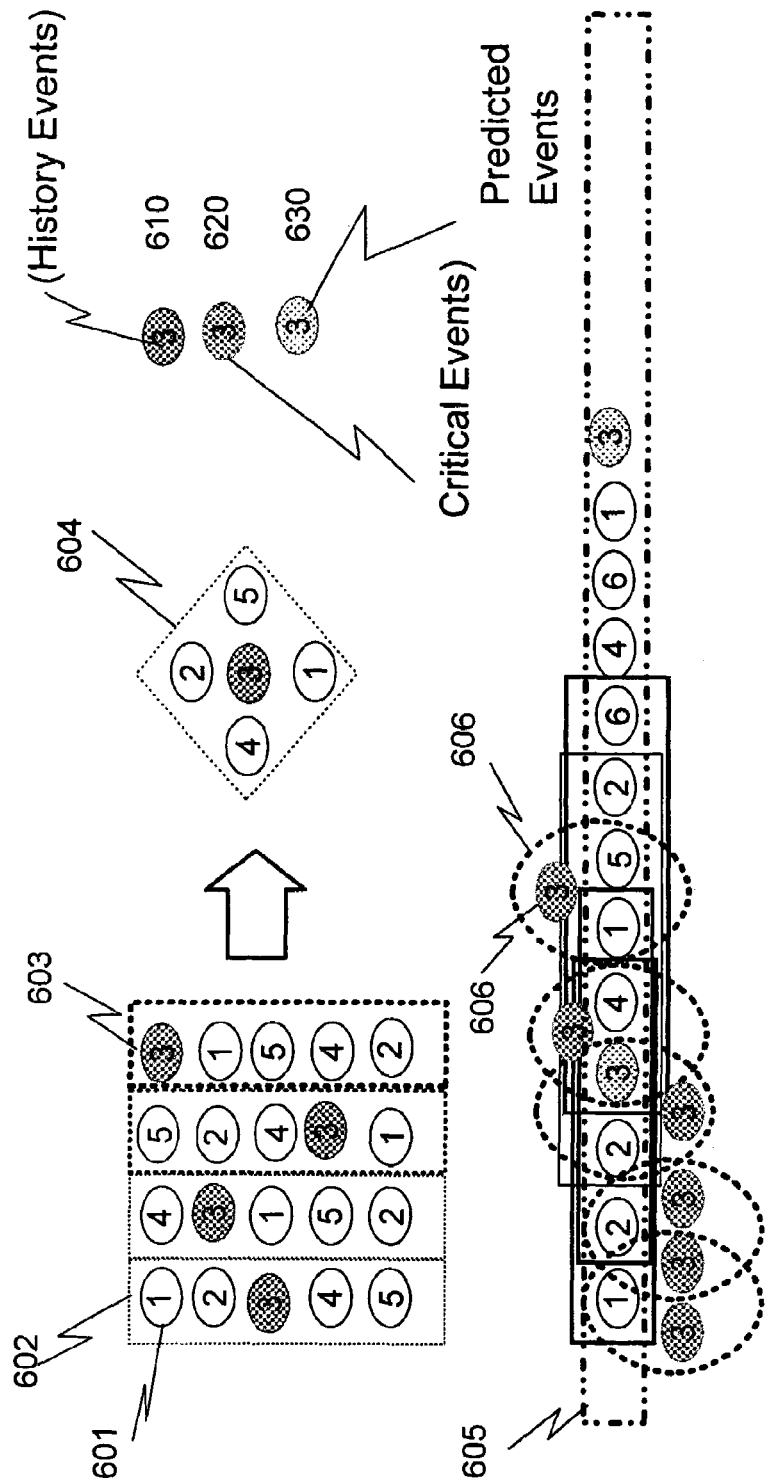
Figure 6  Dynamic Grouping Mechanism

| Critical Event | Event Type/Id | Associated Non-critical Events | Conditional Probabilities | Joint probabilities |
|---|---|---|---|---|
| 3 | Severity (5) | 1, 2, 4, 5 | 0.1, 0.5, 0.7, 0.4 | 0.3, 0.5, 0.6 |
| 10 | Severity (4) | 3, 7, 9, 11, 13, 8 | 0.2, 0.4, 0.4, 0.5, 0.6 | 0.5, 0.7, 0.8 |
| Cn | | NCn | Pn | JPn |

701  702  703  704  705

Figure 7. History table with probability (700)

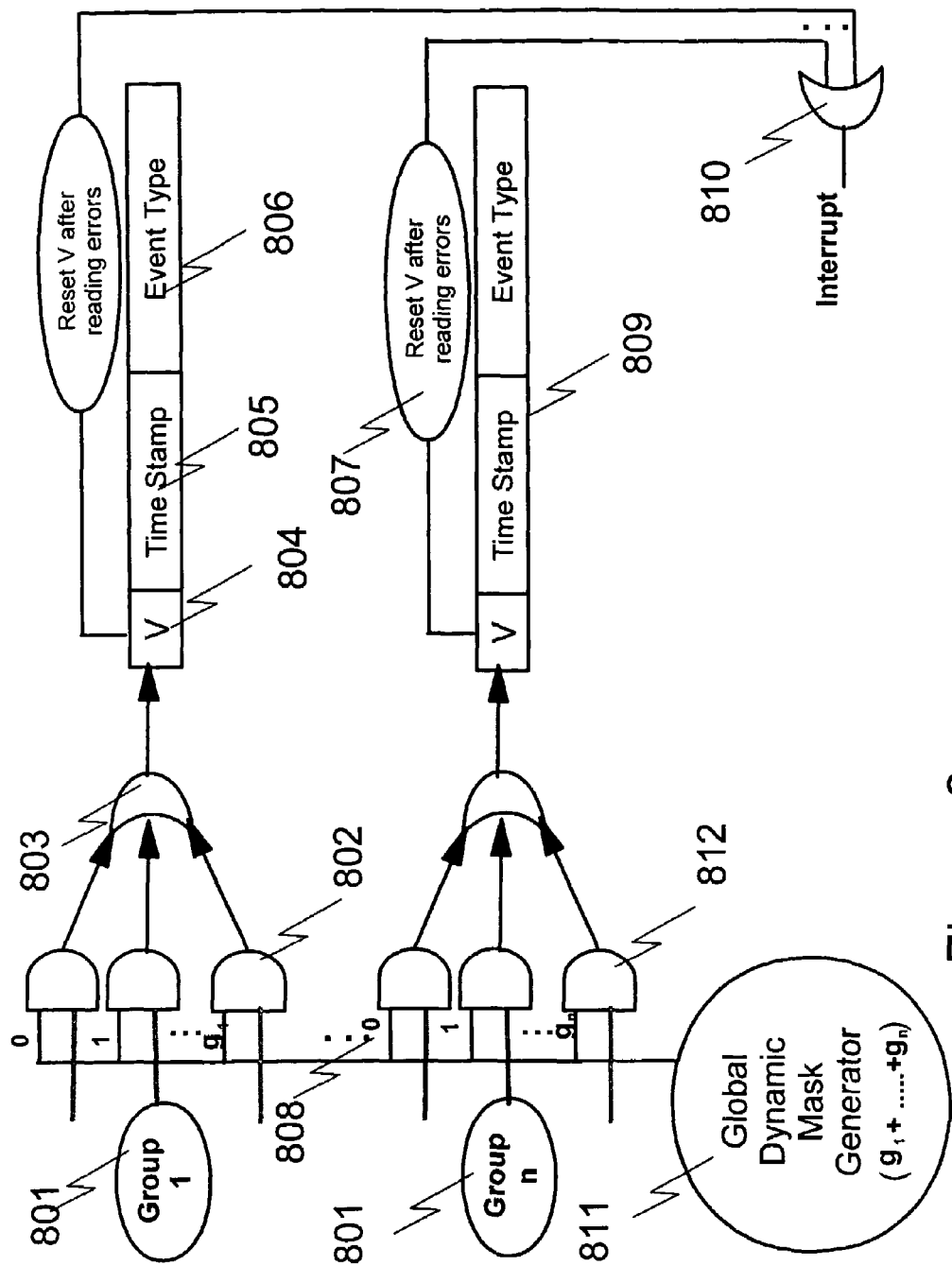
Figure 8    Hardware Implementation

HARDWARE/SOFTWARE BASED INDIRECT TIME STAMPING METHODOLOGY FOR PROACTIVE HARDWARE/SOFTWARE EVENT DETECTION AND CONTROL

STATEMENT REGARDING FEDERALLY SPONSORED-RESEARCH OR DEVELOPMENT

This invention was developed under Subcontract No. B517552 between the Regents of the University of California Lawrence Livermore National Laboratory and IBM T. J. Watson Research Center. The Government may have certain rights in this invention.

CROSS-REFERENCE TO RELATED APPLICATIONS

Not Applicable.

INCORPORATION BY REFERENCE OF MATERIAL SUBMITTED ON A COMPACT DISC

Not Applicable.

FIELD OF THE INVENTION

The invention disclosed broadly relates to the field of computer network management. More particularly, the present invention relates to hardware and software for monitoring and capturing the behavior of undesired events and event generating components or subsystems on a distributed system through indirect time stamping and performance of online and offline dynamic masking of the event information for probing and minimization of future undesirable events.

BACKGROUND OF THE INVENTION

A distributed system typically contains a plurality of processors, subsystem components, instruments and other electronic devices. These may include a number of software and real-time system monitoring devices for system environmental parameters. These devices, processors, intra processor components, system software and hardware components need to be synchronized with one another in order to correlate the occurrence of any usual or unusual software or hardware events spanning over one or more independent functional units. Thus, the synchronization in time to a desired precision level affects both the design and the debugging of the distributed system before and after the hardware manufacture.

With respect to the occurrence of faults in large scale distributed systems, logging hardware and software events, isolating faults and identifying problems are some of the most difficult tasks to perform. In order to achieve these features, it is necessary to precisely order the events in terms of their occurrence through synchronized time stamps. Usually time stamps are obtained by issuing system calls to the operating system. However, this approach does not address problems such as, once a node fails, there is no guarantee that the system call will be able to obtain the time stamp successfully executed. In addition, there is a non-deterministic processing time to service the system call which makes precise time stamping difficult. Furthermore, multiple error events may get the same time stamp which prevents event ordering. Even if an ordering scheme through indirect time stamping can solve such a problem, it is time consuming to record the events, process these events and then take action for the system. Finally, if all events get the same treatment in terms of preprocessing and taking an action, the time required to take an action might be too long to prevent short term events accruing within a particular node. Hence there is a need, not only to precisely record the occurrences of faults without system intervention, but also to design a system which is able to address the long term and short term events in such a manner that the action plan is more effective. There is also a requirement to have the machine state of any distributed system properly frozen for future debugging and probing.

SUMMARY OF THE INVENTION

An embodiment of the present invention is directed toward a distributed network having a plurality of processors. A local counter is associated with each of a plurality of processors in the distributed network. An event register is associated with each of the local counters. A system monitor receives a counter value from the local counter in response to an event being registered in the event register. The system monitor includes an event logger for storing information concerning at least a portion of the events. The event logger preferably records data concerning a type of event registered by the event register and a time an event occurred. The event register remains frozen until the event register is read by a monitoring system. Masking mechanisms filter the event register outputs to differentiate between critical and non-critical events. The masking is dynamically updated during online processing. During offline analysis conditional probability calculations are done to prepare the conditional probability table. During online analysis conditional probability lookups are performed to determine if a probability of an event occurring has exceeded a threshold level and to determine if remedial or accommodative action needs to be taken. The counter is preferably 64 bits or more in width to insure an accurate time stamp. The event register preferably includes an error time stamp register that receives a value from the local counter when an event occurs and an error occurred register that indicates to the system monitor that an error event has occurred.

Another embodiment of the present invention is directed toward a method of producing a time stamp for an event occurring on a distributed network that includes a plurality of processors. According to the method, a local counter value is produced for each of a plurality of processors in the distributed network with an associated counter. The local counter at each of the processors is synchronized with a global clock. The local counter for a processor is frozen when an event associated with the processor occurs. The local counters are periodically polled with the system monitor. The events are dynamically filtered based on a recorded history of information associated with the occurrence of events such that only critical events are reported to the system monitor. During online analysis, conditional probability lookups are performed to determine if a probability that a critical event will occur exceeds a threshold level and preventative action is performed if such threshold is exceeded. Events that occur are dynamically masked based on conditional probabilistic lookups using machine learning algorithms during online analysis. The type of event that occurred is determined and whether or not to produce a global alert, synch stop or machine check alert signal is determined based upon the type of event that occurred. Offline analysis is used to update the history table and conditional probabilities and determine when online analysis of a problem is possible.

Yet another embodiment of the present invention is directed toward a distributed computer system having hardware and software for implementing a time stamping process to produce a time stamp associated with an occurrence of an error event. The distributed computer system includes a plurality of local counters wherein each counter is associated with a particular processor or system in the distributed computer system. An event register records event information concerning an occurrence of a critical event associated with the processor and event register. An event logger receives and logs information concerning the occurrence of the events. A global clock synchronizes the local counters. Dynamic masks or filters are created based upon historical event information to determine whether or not an event that occurred is a critical event. Software evaluates events based on conditional probabilistic calculations and schedules remedial or preventative action accordingly during online analysis.

BRIEF DESCRIPTION OF THE DRAWINGS

FIG. 5 is a second portion of a flow chart of a preferred online mechanism for implementing an embodiment of the present invention;

FIG. 6 is diagram of a preferred dynamic grouping mechanism according to an embodiment of the present invention;

FIG. 7 is history table structured in accordance with an embodiment of the present invention;

FIG. 8 is a diagram of a hardware implementation of an embodiment of the present invention.

DETAILED DESCRIPTION

The present invention provides hardware and software mechanisms that achieve accurate time stamping through indirect means and dynamic masking mechanisms for online event isolation and control. Both the hardware and software dynamic masking mechanisms are based on conditional probabilistic calculations using machine learning algorithms. The conditional probabilities and event histories are updated during offline analysis. Event prediction and process migration is performed during online analysis.

Figure 1:
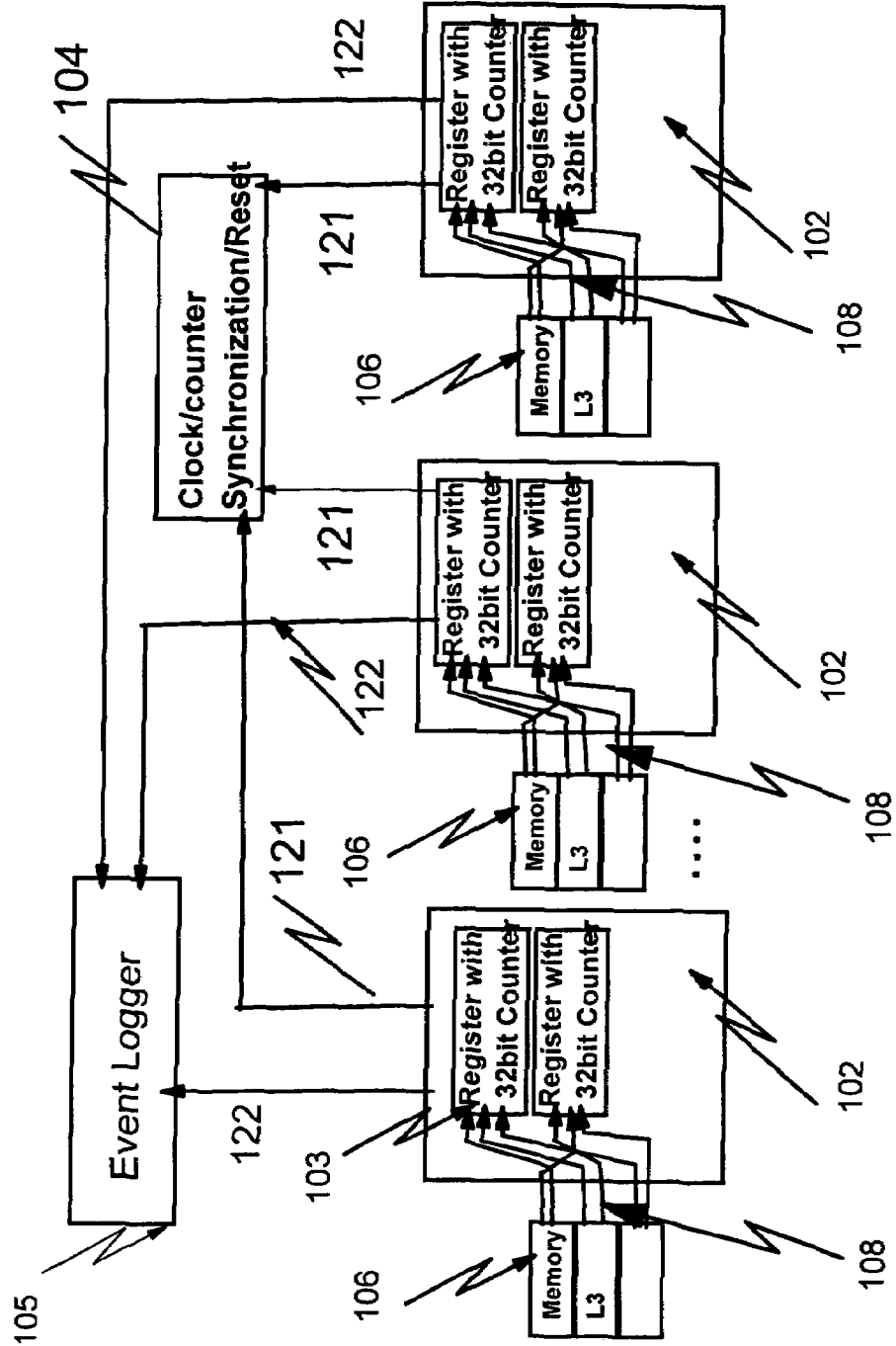
FIG. 1 is a block diagram of an event logging mechanism according to an embodiment of the present invention.

Referring to FIG. 1, an illustration of a software and hardware based indirect time stamping and event logging mechanism 100 for a distributed system of processors 102 constructed in accordance with an embodiment of the present invention is shown. In a preferred embodiment, each processor 102 in the distributed system has a hardware register with a counter 103. The counters 103 are most preferably more than 64 bits in width such that they provide a high level of accuracy. The counters 103 are synchronized through links 121 with a global clock/counter synchronizer 104 that resets the counters 103. The hardware counters 103 are used to log error events that occur with their associated processor 102. An error occurred value in the registers 103 is initially set to FALSE. Once an error has been detected, a time stamp for the error is recorded in the registers 103 and the error occurred value is set to TRUE. Once the register 103 value has been read by the event logger 105 through links 122, the error occurred value is reset to FALSE. The registers and counters 103 are also reset once the information has been polled out of the registers and counters 103 for entry into the event logger 105. Online interrupts can be triggered globally based on the events collected through the use of a global interrupt as discussed in more detail below.

The use of a dedicated register and counter 103 allows a more accurate time stamp to be obtained without a system call by the clock 104 to obtain the time stamp for an event that occurred. In accordance with the approach, the clock 104 is synchronized to a higher accuracy than the accuracy level at which the error events are collected. Thus, the clock's 104 accuracy level may be on the order of 1 microsecond throughout while the distributed system records the time in increments of seconds. To collect the events at a higher level of accuracy, the counters 103 are selected to be large enough to provide a high degree of resolution within the required recording accuracy time. Each counter 103 resets at the same time globally within the distributed system. Thus, all events, irrespective of the processor 102 at which they occur, can be time stamped at a particular instant and counter 103 value which is frozen when the event occurs at the particular processor 102 or chip. In addition, event information 108 is passed from the memory 106 to the registers 103 when an error event occurs. The registers 103 preferably include a device control register that stores event type information related to the occurrence of an event. Since the counter 103 value is frozen in the register 103, the accuracy of the system event recording can be independent of the frequency at which the events are polled from the processors 102 or chips to be recorded globally through the event logger 105. Although a global synchronized clock time is preferred, the approach can easily be extended to cluster systems that do not have such a clock 104.

The global event logger 105 registers the counter 103 based event logs in an order that is based on the counter values from the counters 103. The event logger 105 can be implemented using a history table which preferably contains an event identification number, event type and counter value in a standard text format. The event logger 105 obtains logging information such as that set forth above from the register counters 103 through links 122. The global clock 104 is used to synchronize the counters 103 through links 121. Thus, the global clock 104 time is related to the local counters' 103 counts. Event information 108 is passed from the hardware memory 106 to the registers 103. An example of such an event would be an interrupt due to a malfunction. The registers 103 can then be polled by a system monitor for event information according to a time-based schedule or in response to interrupt signals.

Figure 2:
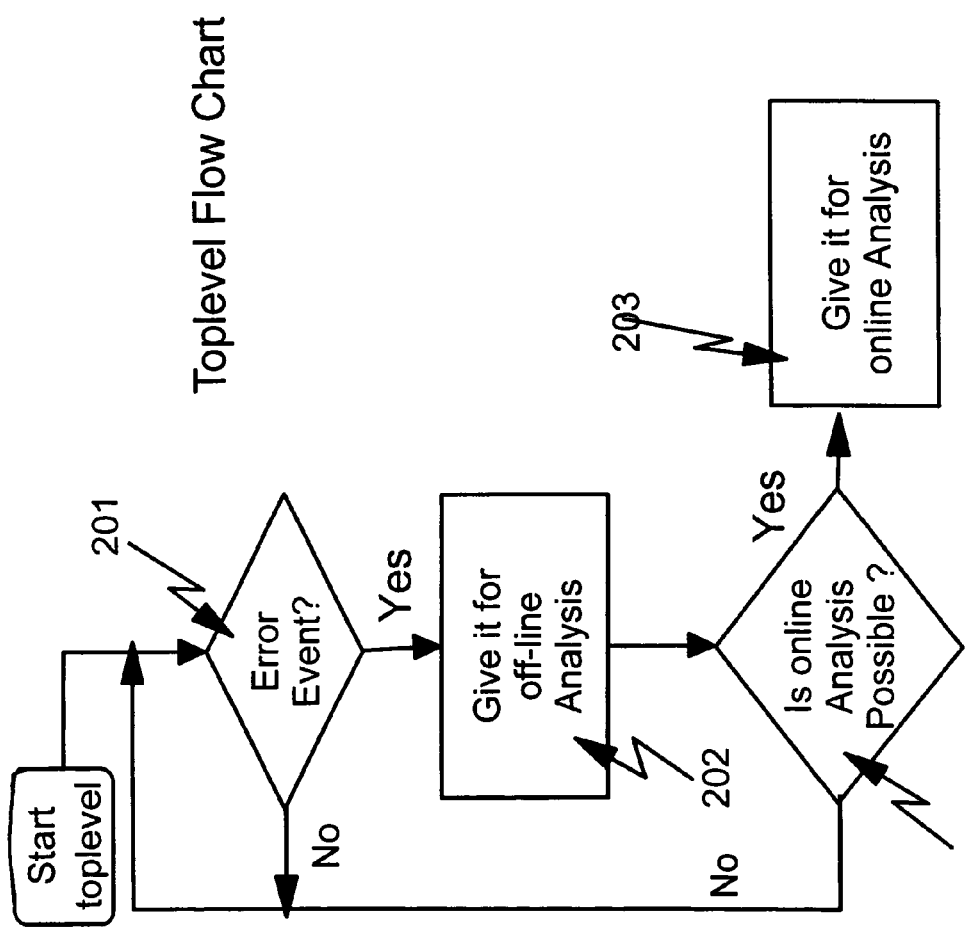
FIG. 2 is a top level flow chart for determining whether to use online analysis or offline analysis according to an embodiment of the present invention.

Referring now to FIG. 2, a top level flow chart describing a method for analyzing an error event with offline and online analysis according to an embodiment of the present invention is shown. Generally, offline analysis will be a continuous process which is carried out independently of the online analysis processes. The method starts in step 201 with a check to see if an error event has occurred. If no error event has occurred, the method returns to step 201 to wait for the occurrence of an error event. If an error event has occurred, the method proceeds to step 202 wherein the error event is reported for offline analysis. Once offline analysis has been completed, the method determines in step 205 if online analysis is possible. Online analysis is only possible when dynamic event groups are well established and conditional probability calculations are complete offline. If dynamic masks and masking events can not be established through an available list of error events downloaded from a history table, the online masking process waits until sufficient information is available from the offline processes. If online analysis is possible, the error event is handled through online analysis in step 203. If online analysis is not possible in step 205, the method returns to the loop of step 201 wherein it waits for the next error event to occur. As discussed in more detail below, the use of online analysis reduces the time required to migrate a process away from the likely occurrence of a critical event.

Figure 3:
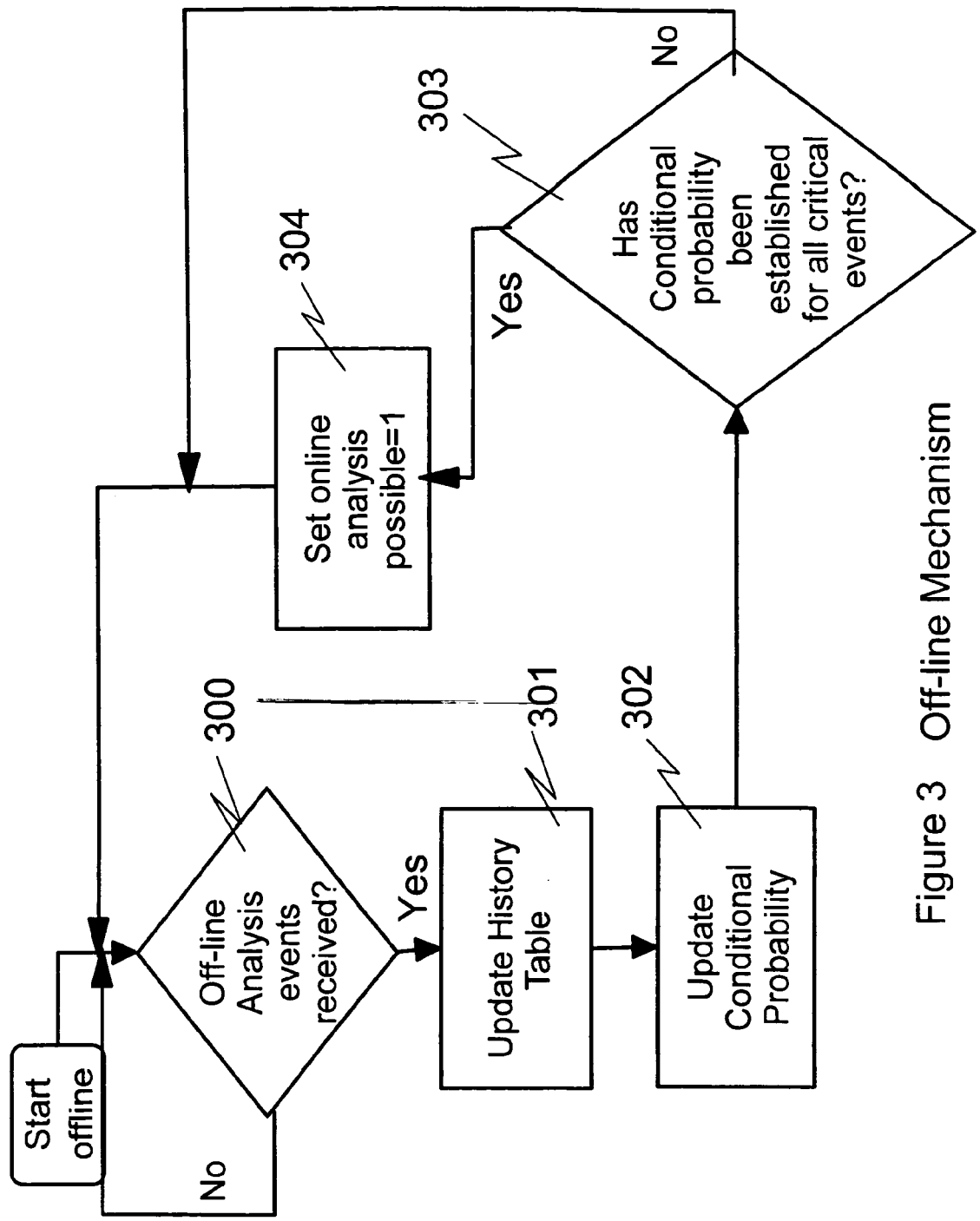
FIG. 3 is a flow chart of a preferred offline mechanism for implementing an embodiment of the present invention.

Referring now to FIG. 3, a preferred offline mechanism for implementing an embodiment of the present invention is shown. The mechanism first determines if events for offline analysis have been received in step 300. If events for offline analysis have not been received, the mechanism loops back to step 300 until an event for offline analysis is received. If an event for offline analysis has been received, the mechanism proceeds to update the history table in step 301. The mechanism also updates the conditional probabilities for events associated with the event in step 302. Conditional probability calculations are performed to determine the probability of the associated critical event occurring. The probability of an event occurring is preferably based upon a time window size that is selected by the designer that determines which events are considered associated. In step 303, the mechanism determines if a conditional probability has been established for all critical events. If a conditional probability has not been established for all events, the mechanism returns to step 300 wherein it waits for an event for offline analysis. If a conditional probability has been established, the mechanism sets on online analysis register value to one in step 304 and waits for the next offline analysis event to be received.

Figure 4:
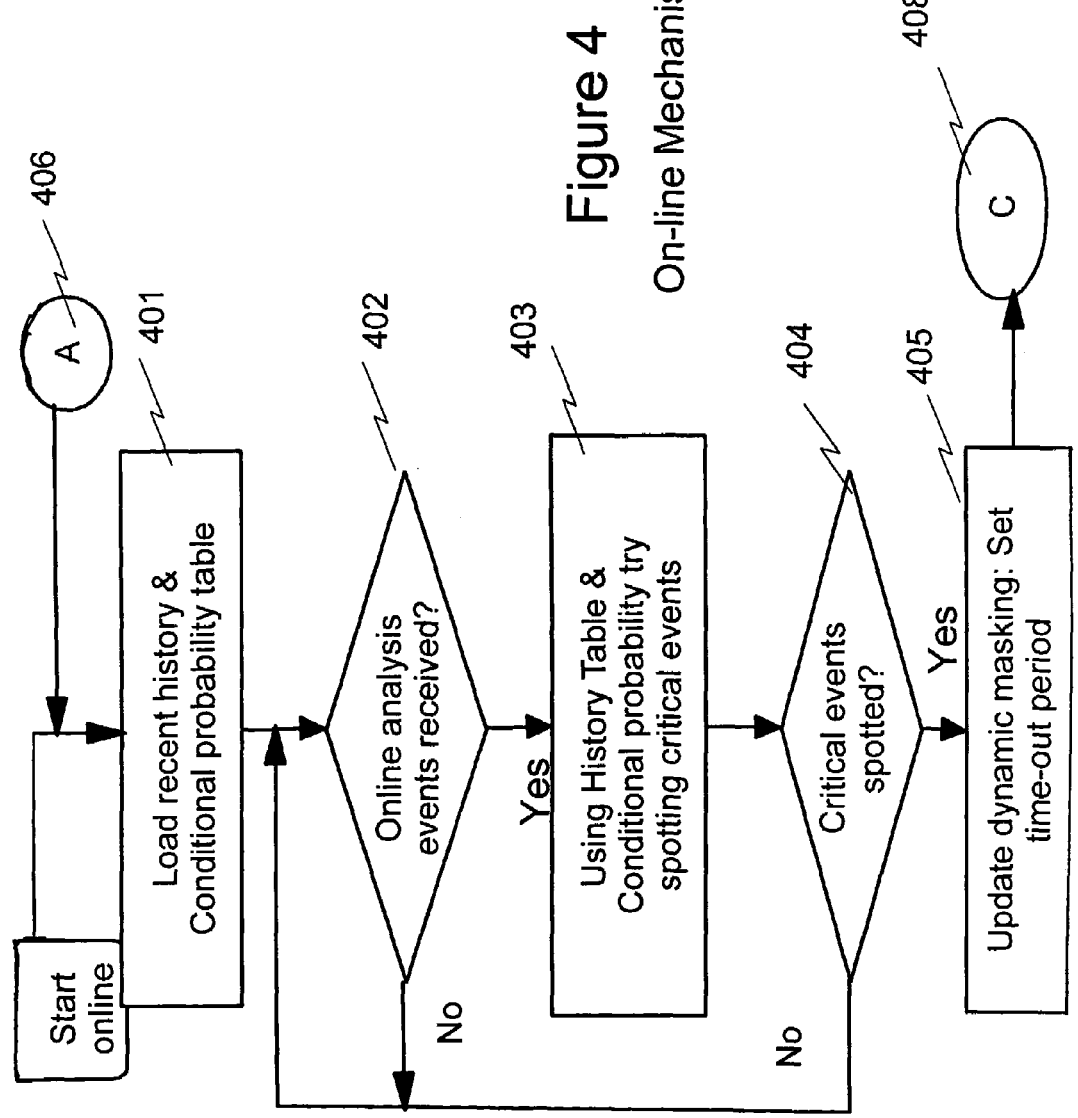
FIG. 4 is a first portion of a flow chart of a preferred online mechanism for implementing an embodiment of the present invention.

Referring now to FIG. 4, an online mechanism for handling the occurrence of error events during online processing is shown. The online mechanism first loads the recent history and conditional probability tables in step 401. The online mechanism then determines if an online analysis event has been received in step 402. If not, the mechanism loops back to step 402 until an online analysis event is received. If an online analysis event has been received, the mechanism uses the history table and the conditional probability table to try to spot future critical events in step 403. The set of events can be checked to determine which events are the most critical and what further events are associated with their occurrence. In step 404, the mechanism determines if the probability of the occurrence of a critical event has surpassed a lower threshold level. If such a critical event is not predicted, the mechanism returns to step 402 wherein it waits to receive an online analysis event. If such a critical event is predicted, the mechanism updates its dynamic masking and sets a time-out period in step 405. The dynamic masking reduces the processing time during online analysis, so that short term actions can be taken.

The mechanism then proceeds to step 408 as shown in the flow chart of FIG. 5. The mechanism of FIG. 5 waits to receive an online analysis event in step 501. When an online analysis event is received, the mechanism determines if the time-out period has elapsed in step 502. If the time-out period has not elapsed, the online mechanism determines if the probability of the occurrence of a critical event has converged toward a higher threshold value in step 503. If a critical event is predicted to occur, the online mechanism takes action in step 510 to migrate the process away from the predicted critical event occurrence, schedule maintenance, etc. The online mechanism evaluates the probability that the associated events will occur in determining what type of remedial action needs to be taken. Once the remedial action is taken, the mask is reset in step 521 and the mechanism returns to step 406 of FIG. 4 wherein the online analysis mechanism restarts. If the time-out period has elapsed in step 502, the mask is reset in step 521 to zero and the online mechanism is restarts in step 406.

Referring now to FIG. 6, a simplified dynamic grouping mechanism in accordance with an embodiment of the present invention is shown. Consider that a series of events are being recorded from a system in a table 603. The table 603 contains processed information from an event logger. Consider that a set of five events (604) are found to occur associating a critical event 3 (620). Based on table 603, conditional probability values for each event or set of events associated with critical event(s) 620 are recorded into probability history table (700) in FIG. 7 during offline analysis. So, when a series of events (605) occur in a system, at any instant of time, we lookup the conditional probabilities of the events and figure out whether the joint probability associated with the events so far has reached a lower threshold value. A dynamic grouping mechanism (606) of the events happening on a system with our target event(s) (the critical event(s) three (620)) help to choose the probabilities and joint probabilities from the probability table (FIG. 7). If the joint probability (705) or conditional probability (704) reaches a specified lower threshold value then the online mechanism is ready to take action through 510 in FIG. 5. A preferred embodiment of the present invention uses online conditional probability based filtering mechanisms. The conditional probability information is contained in a probability history table (FIG. 7). The probability history table also contains information related to the severity of the events and the non-critical events that are associated with the critical events. Referring now to FIG. 7, a preferred history table 700 with conditional probability information in accordance with an embodiment of the present invention is shown. The history table 700 contains a list of critical events 701 that may occur on a distributed network. For each critical event 701, event type information 702 that indicates the severity of the occurrence of the event 701 is stored. A list of associated non-critical events 703 contains the non-critical events that are associated with the occurrence of the critical event 701. The history table 700 also contains the conditional probabilities 704 and joint probabilities 705 for each of the associated non-critical events. The joint probability is a probability that a sequence of (two or more) non-critical events happens before a critical event. The conditional probability and joint probability are calculated for insertion into the probability history table during offline analysis.

Based on offline and online analysis, global masks can be designed. The dynamic masking process identifies a particular set of critical events and the associated cloud of non-critical events occurring in the neighborhood of the critical event. Dynamic groups are then established based on the type of critical events and the associated non-critical events. The number of non-critical events to be included within the grouping mechanism is determined by the designer, type of system and the number of simultaneous events that are required to be listed as critical events.

Referring now to FIG. 8, a preferred hardware implementation of the dynamic masking process of an embodiment of the invention is shown. Dynamic groups 801 are established based upon the type of critical event and the associated non-critical events. Based on offline and online analysis, global masks 808 are designed AND gates 812 are used to mask and unmask events. An OR gate 803 is also used to record the final time stamp and event type in the event logger. The events are masked or filtered such that information is only collected for critical events and associated non-critical events. A variety of techniques can be used to mask the events. For example, a device control register mask may be used to filter information from the counters and registers such that only certain critical events result in a global alert, machine check alert or synchronization stop signal being generated by the system monitor or service/host processor. The collected information for a critical event preferably includes a counter value 804, time stamp 805 calculated based on the synchronized clock and event type 806. The counter value 804 is reset 807 after the error information is read. A global interrupt 810 is used to trigger online interrupts globally based upon the occurrence of the event. Global dynamic mask generators 811 may be customized to filter specific events through any type of desired bit masking mechanism.

Figure 9:
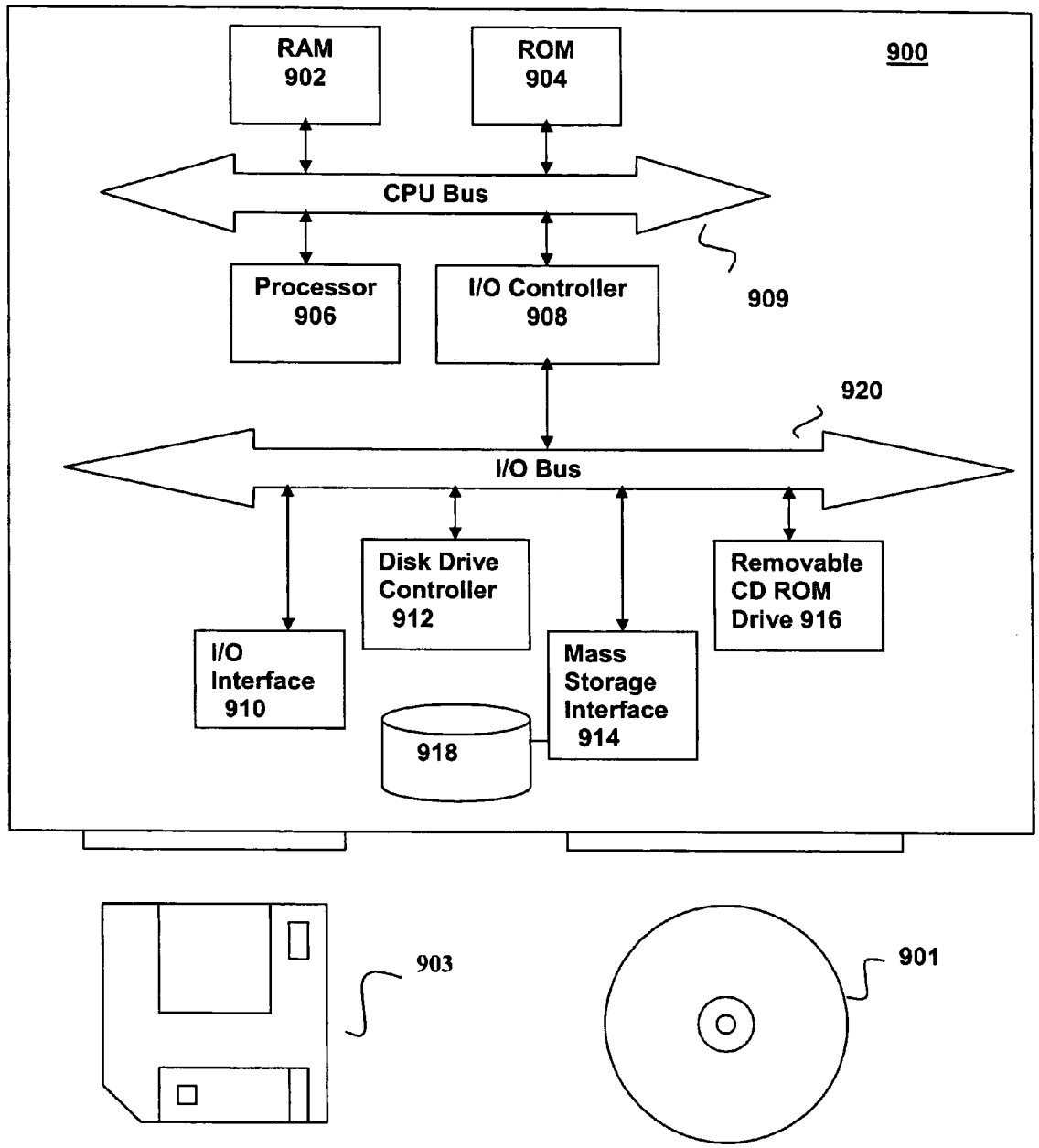
FIG. 9 is a block diagram of an information handling system that can be used to implement an embodiment of the present invention.

Referring now to FIG. 9, a block diagram of an information handling system 900 that can be used to implement an embodiment of the present invention is shown. The system 900 includes a processor 906, a random access memory 902, read only memory 904 and input/output interface 910. Additionally, a disk drive subsystem 912, input/output controller 908 a mass storage device 918 and interface 914, and a CD ROM drive 916 are included. The processor 906 has a system-on-chip embodiment of the counters, registers and masks as discussed herein. When an error event occurs on the system 900, a local time stamp is recorded for the error event. Event information including the time stamp is sent from the system 900 through the input/output interface 910 to a remote monitoring system that logs the information and decides upon remedial or preventive action. Software can be loaded on a computer readable medium, such as the diskette 903 or CD ROM 901, to operate the programmable computer system 900 according to an embodiment of the present invention.

What has been shown and discussed is a highly-simplified depiction of a programmable computer apparatus. Those skilled in the art will appreciate that other low-level components and connections are required in any practical application of a computer apparatus. Therefore, while there has been described what is presently considered to be the preferred embodiment, it will be understood by those skilled in the art that other modifications can be made within the spirit of the invention.

We claim:

1. A method of analyzing events occurring on a distributed network comprising a plurality of processors, the method comprising:

during offline processing:
updating a recent history table with critical events and any associated non-critical events that may occur in the distributed network;
computing conditional probability values into a probability table, said probability values comprising joint probability values reflecting a probability that a sequence of two or more non-critical events happen before the critical event occurs;
periodically updating the probability table;
periodically examining the probability table to determine when online analysis of the non-critical event is possible; and
generating event masks for use in a masking mechanism to filter a subset of the non-critical events associated with the critical events so that online analysis can be carried out in real-time;

during online processing:
loading the conditional probability table and the event masks computed from offline analysis;
dynamically filtering the non-critical events using the masking mechanism comprising timeout and probability thresholds;
determining that the probability of the occurrence of the critical event has surpassed a threshold level using the conditional probability table;
migrating a process away from the critical event if it is determined that a timeout period has not elapsed; and
if it is determined that the timeout period has elapsed:
reloading the conditional probability tables; and
generating new event masks to filter another subset of the non-critical events.

2. The method of claim 1 wherein the step of dynamically filtering comprises:
using AND gates to filter and unfilter events based on online and offline analysis; and
using OR gates to record a final time stamp and event type in the recent history table.

3. The method of claim 1 further comprising an online processing step of:
producing a local counter value for each of the plurality of processors in the distributed network.

4. The method of claim 3 further comprising an online processing step of:
synchronizing the local counter value at each of the processors with a global clock.

5. The method of claim 4 further comprising an online processing step of:
freezing the local counter value for a processor when a critical event associated with the processor occurs.

* * * * *